G. H. BOURNE.
REGISTERING DEVICE.
APPLICATION FILED NOV. 16, 1916.

1,359,484.

Patented Nov. 23, 1920.
3 SHEETS—SHEET 1.

Inventor.
George Harry Bourne

G. H. BOURNE.
REGISTERING DEVICE.
APPLICATION FILED NOV. 16, 1916.

1,359,484.

Patented Nov. 23, 1920.
3 SHEETS—SHEET 2.

Inventor.
George Harry Bourne
by H. J. S. Dennison
Atty.

UNITED STATES PATENT OFFICE.

GEORGE H. BOURNE, OF TORONTO, ONTARIO, CANADA, ASSIGNOR OF ONE-HALF TO CHARLES MILLAR, OF TORONTO, ONTARIO, CANADA.

REGISTERING DEVICE.

1,359,484.   Specification of Letters Patent.   Patented Nov. 23, 1920.

Application filed November 16, 1916. Serial No. 131,755.

*To all whom it may concern:*

Be it known that I, GEORGE HARRY BOURNE, a subject of the King of Great Britain, and resident of the city of Toronto, county of York, Province of Ontario, in the Dominion of Canada, have invented certain new and useful Improvements in Registering Devices, described in the following specification and illustrated in the accompanying drawings, that form part of the same.

The principal objects of the invention are, to effect an accurate and rapid calculation of various amounts and to devise a mechanism of great flexibility which will receive and definitely register any number of amounts either in one or several groups giving the totals in each group and also the grand total.

A further object is to provide means for indicating the totals which may be seen for a great distance.

The principal feature of the invention consists, in the novel construction and arrangement of parts whereby steel balls are directed in varying quantities to a receptacle from which they are deposited in definitely spaced individual pockets in a rotating member and said balls operate a gear wheel by means of which indicating members are operated, and whereby the balls are maintained in continuous circulation.

In the drawings Figure 1 is a perspective view of a portion of a machine constructed in accordance with this invention.

Figure 1:
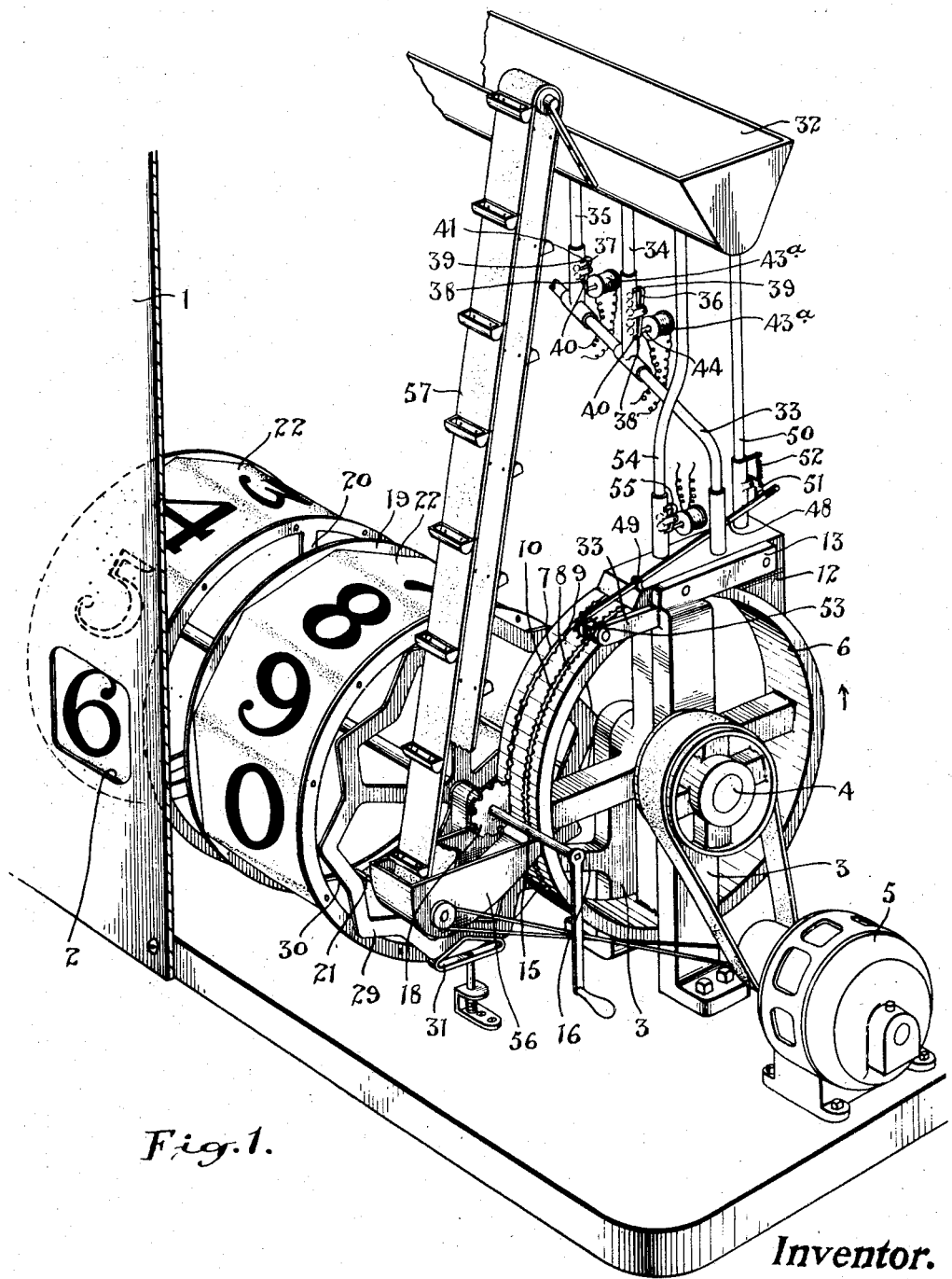

This invention is devised to register at a central station the amounts registered in a plurality of individual stations and is adaptable for use for many purposes.

In the device illustrated in the accompanying drawings like numerals of reference indicate like parts in the various figures.

The device as herein illustrated is arranged within a suitable cabinet having in the front face 1 a series of openings 2 through which the indicating numerals are seen.

A rigid frame 3 is mounted upon the base of the cabinet and a shaft 4 is journaled in bearings in said frame, said shaft being driven by a suitable motor 5.

A drum 6 is mounted on the shaft 4 and in its periphery is formed a plurality of circumferential rows of pockets 7 and 8. These pockets are spaced equidistantly around the periphery and are connected by annular grooves 9 and 10 arranged centrally of the width of the pockets. The pockets are of a uniform depth and are adapted to receive and temporarily hold the steel balls 11 which thus form the teeth of a gear.

The balls are fed into the pockets by gravity as the drum rotates and are contained in compartments within a casing 12 which is arranged over the periphery of the drum at the top side, being supported by the arm 13 of the frame 3.

The casing 12 is open on the underside and the balls placed therein rest upon the surface of the drum and drop into the pockets as the drum rotates. The interior of the casing is divided by a longitudinal partition 14 arranged between the rows of pockets in the drum.

Figure 2:
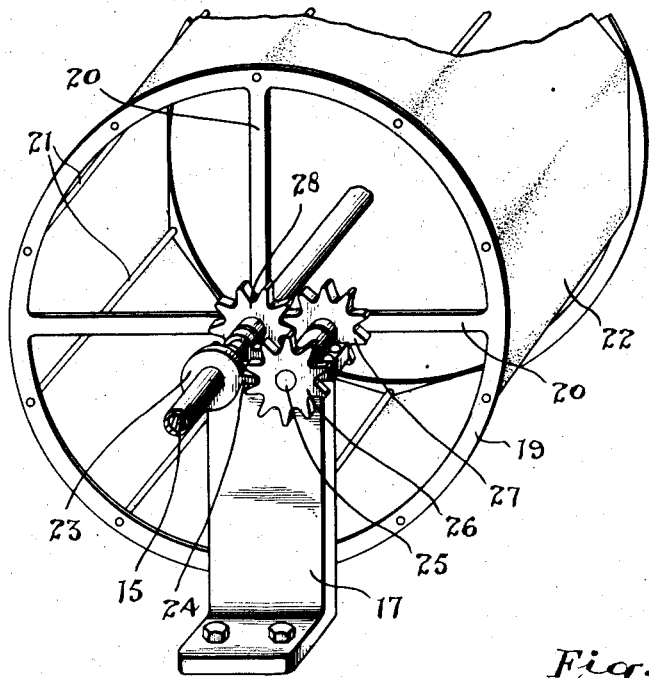
Fig. 2 is a perspective detail of part of the indicating mechanism.
Figure 4:
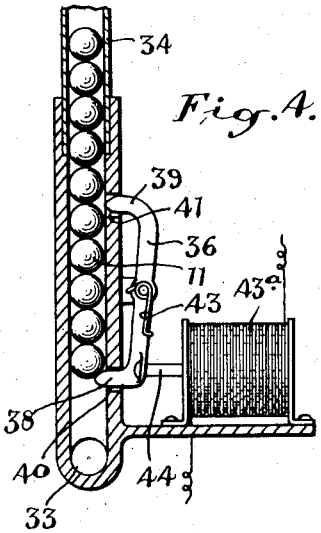
Fig. 4 is an enlarged sectional view of one of the ball holders showing the feed mechanism.
Figure 3:
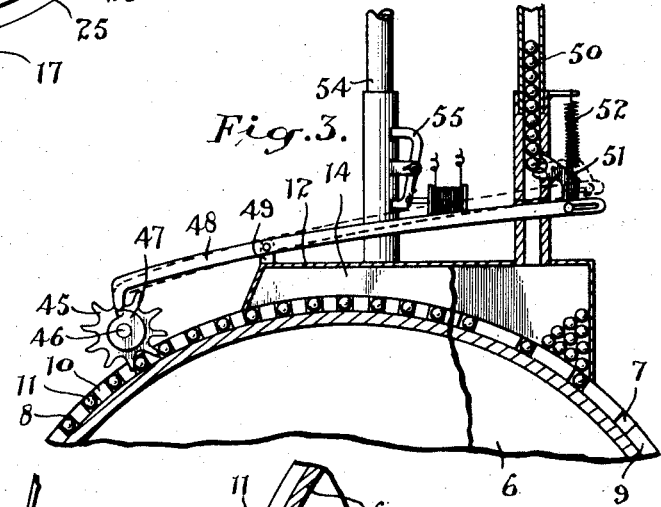
Fig. 3 is an enlarged sectional view of a portion of the rotating ball holding drum and an intermediate totalizing device.
Figure 5:
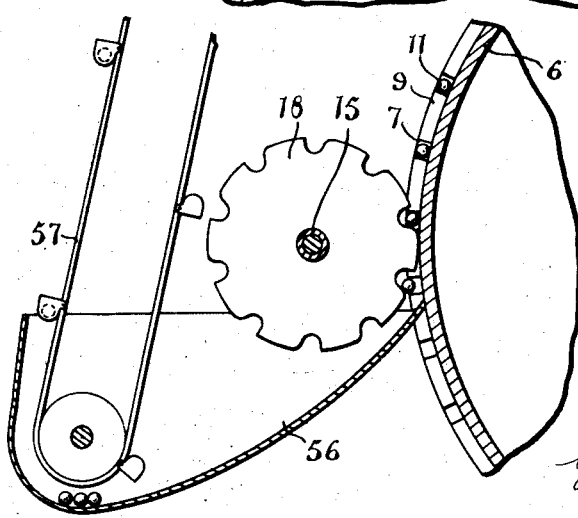
Fig. 5 is an enlarged sectional view of a portion of the rotating ball holding drum showing the main register operating gear and means for returning the balls after operating the register.

15 is a tubular shaft mounted at one end in a journal on the bracket arm 16 of the frame 3 and at the other end in a standard 17, shown in Fig. 2.

18 is a toothed gear wheel secured to one end of the shaft 15, the periphery thereof being divided into ten teeth, of a mesh corresponding with the spacing of the pockets 7. These teeth extend into the peripheral groove 9 in the drum and co-act with the temporary teeth formed by the balls. It will be noted that each ball carried by the drum will thus act to move the gear 18 one-tenth of a revolution.

19 are circular frames supported on the shaft 15 by the radial arms 20 and spaced apart by the rods 21 which are ten in number.

22 is a strip of fabric stretched over the rods 21 and presenting ten flat spaces upon which are printed the numerals 0 to 9, thus forming an indicator bearing large numerals which may be easily read a considerable distance away.

Any desirable number of these indicators may be provided according to the desired capacity of the machine.

23 is a gear wheel mounted on the shaft 15 at the side of the indicator farthest from the gear 18, said gear 23 having one tooth 24.

25 is a short shaft journaled in the standard 17 having the ten-toothed gear wheels 26 and 27 secured thereto, one of said gears being arranged to mesh with the single toothed gear 23 and the other meshing with a ten tooth gear 28 secured to the shaft of the next succeeding indicator member.

This arrangement of gearing is repeated between the successive indicators so that one complete revolution of each indicator moves the succeeding one one-tenth of a revolution, thus providing a simple multiplying indicator.

The indicator members are each provided with a light metal wheel member 29 having ten obtuse angled indents 30 in the periphery and these wheels engage spring latch members 31 carried on the base so that a stop is provided to arrest the indicators following each movement.

32 is a trough shaped receptacle arranged above the machine adapted to hold a supply of steel balls used in operating the indicator members.

33 is a tube connected to the casing 12 and communicating with the chamber arranged above the pockets 8 in the drum and leading angularly upward beneath the receptacle 32.

34 and 35 are tubes leading from the bottom of the receptacle 32 to the tube 33.

36 and 37 are rocker members pivotally mounted on brackets arranged on the tubes 34 and 35, each being formed with inwardly turned ends 38 and 39 which extend into openings 40 and 41 in the side of the tube. Spring members 43 are arranged to hold the lower ends 38 in the inward position so as to intercept and hold the balls 11.

43ᵃ are electromagnets having their armatures 44 connected to the lower ends of the rocker members 36 and 37 so that when the magnet is energized the member will be rocked to move the upper end 39 into contact with the balls holding those in the upper part of the tube and simultaneously withdrawing the lower end 38 and releasing those which are located below the upper end of the rocker member.

The members 36 and 37 are here shown of different sizes, one being adapted to release five balls at a time and the other to release two. These members may be arranged for releasing any desirable number of balls up to ten.

The magnets are arranged in suitable electric circuits so that by closing a switch the desired member may be operated according to the amount desired to be registered.

The balls thus liberated are directed into the chamber over the register drum and are picked up by the pockets 8.

45 is a gear wheel mounted on a spindle 46 carried on the frame 3. This gear is provided with ten teeth which extend into the groove 10 in the drum and are engaged by the balls located in the pockets 8 as the drum rotates.

A cam 47 is arranged on one side of the gear 45 and operates a rocker arm 48 which is pivoted intermediate of its length on the bracket 49.

50 is a tube leading downwardly from the receptacle 32 to the chamber arranged above the groove 9 in the drum.

51 is a rocker member similar to the members 36 and 37 arranged on the tube 50 and adapted to release one ball at a time. This member is held in one position by the spring 52 and is connected to the end of the rocker arm 48.

The cam 47 raises the engaging end of the arm 48 and depresses the outward end thereof which is connected to the rocker member 51 and is arranged to release it quickly once for every revolution of the gear 45 thereby releasing one ball for every ten balls operating upon the gear 45. The balls thus released are deposited in the pockets 7 on the drum and as the drum rotates they engage and operate the gear 18, consequently the units are eliminated and tens only are shown on the indicators.

The object in thus eliminating the units is to avoid the operation of a unit register which would have to operate very rapidly in machines of large capacity but this eliminating mechanism may of course, be dispensed with if desired.

In machines where the unit register is eliminated a small counter 53 may be arranged upon the spindle of the gear wheel 45.

54 is a tube leading direct from the ball receptacle to the chamber feeding balls to the tens register mechanism and the electrically operated releasing mechanism 55 may be designed to release one, two, three or more balls and as many of these as may be desired are provided, each ball released acting to register ten units.

The various operating magnets may be wired to a number of stations so that registers may be made from various points and any desired amount may be registered and the whole will be totalized in the machine.

The balls, after operating the registering gears, roll out of the pockets as they pass the horizontal center and fall into a pocket 56 from which they are carried by an elevator belt 57 of any suitable design and returned to the receptacle 32. The balls are thus maintained in constant circulation.

Figure 6:
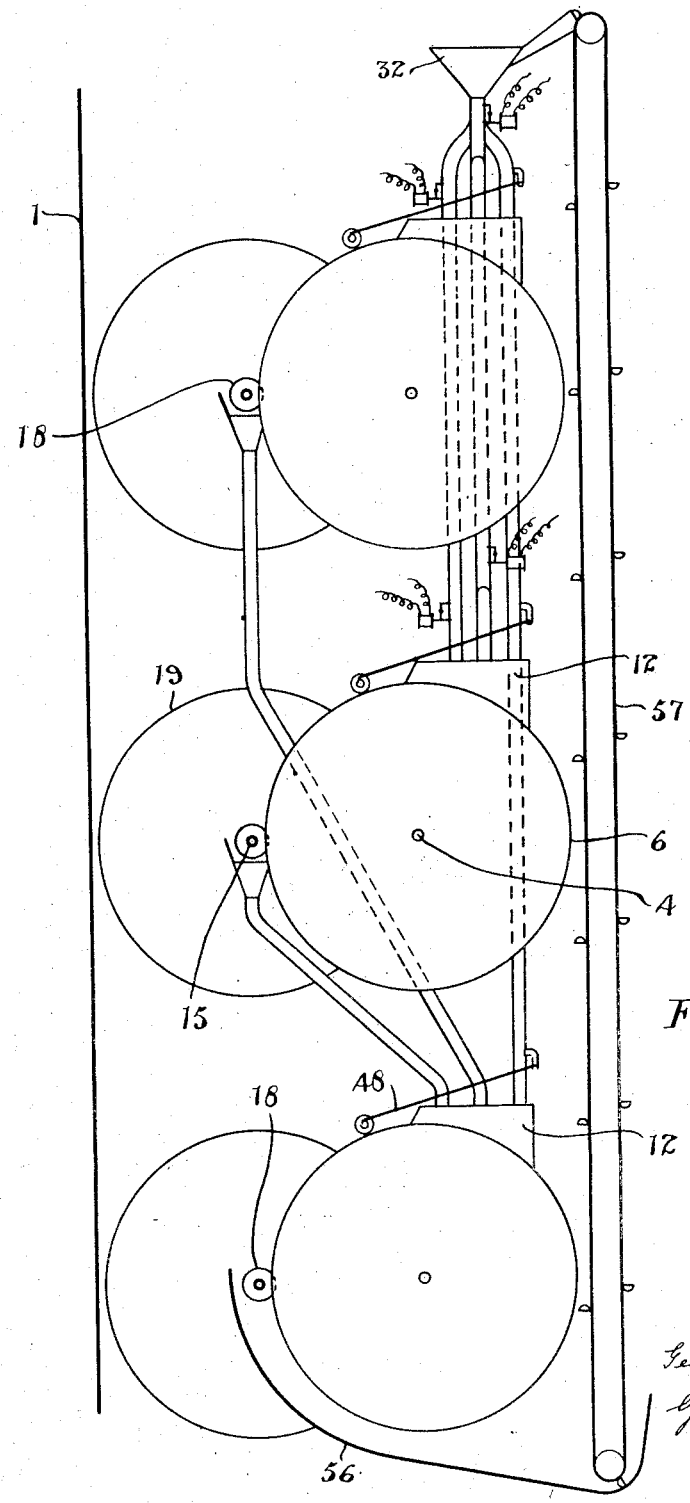
Fig. 6 is a diagrammatic end elevational view showing an arrangement of a plurality of individual registers and a grand total register.

Several banks of indicators may be operated to indicate different totals and a final registering device operated by the balls which pass through the individual banks as illustrated in the diagrammatic view in Fig. 6.

It will be apparent from this description that the unit eliminating mechanism may, if desired, be duplicated to eliminate the tens indicator, the arrangement being within the purview of a skilled mechanic.

In a mechanism such as described, the operation of the registers is worked on the principle of toothed gearing, the balls forming the teeth of one gear to operate the registering mechanism and automatically removing themselves from the drum in which they are carried so that others may take their place, the supply regulating the register made.

The method of supplying the removable gear teeth is simple and positive and the scope of the use of the machine is practically unlimited.

What I claim as my invention is:—

1. In a register operating device, a toothed gear, a revolving drum having a plurality of pockets in its periphery, means for constantly rotating said drum, and balls adapted to be temporarily carried in the pockets of said drum and forming gear teeth adapted to mesh with said toothed gear and after operating said gear to automatically release from said pockets.

2. In a register operating device, a toothed gear, a revolving drum having pockets in its periphery spaced to correspond with the teeth in said gear, and an annular groove arranged centrally of the width of said pockets, balls adapted to temporarily rest in said pockets and to engage and operate said gear, means for constantly rotating said drum, means for feeding the said balls to said pockets from the periphery of the drum, and means for directing the balls from the drum after engaging said gear.

3. In a register operating device, a toothed gear, a revolving drum having pockets in its periphery open at the outer side and spaced to correspond with the teeth in said gear, means for constantly rotating said drum, balls adapted to temporarily rest in said pockets and to engage and rotate said gear, a casing arranged above said revolving drum open upon the underside and adapted to direct the balls into the pockets in said drum, a ball receptacle arranged above said casing, tubes connecting said casing with said ball receptacle, and means for controlling the passage of balls from said receptacles to said casing.

4. In a register operating device, a ten-toothed gear, a drum having a circumferential row of pockets spaced to correspond with the teeth in said gear and adapted to carry balls for operating said gear, means for rotating said drum, means for feeding balls to said pockets, a secondary circumferential row of pockets arranged in the periphery of said drum separate from the aforesaid pockets and spaced equidistantly apart around its circumference, a secondary ten-toothed gear adapted to be operated by said secondary row of balls, and means operated by said secondary gear wheel for feeding balls to the first row of pockets.

5. In a register operating device, a toothed gear wheel, a constantly rotated drum formed with a plurality of circumferential rows of pockets in its periphery, one of said rows having the pockets spaced to correspond with the teeth in the gear, means for feeding balls to one row of pockets for operating said indicator gear, means for feeding balls to the adjacent row of pockets, and means actuated by balls arranged in the said adjacent row of pockets, for operating the said feeding means.

6. In a register operating device, a toothed gear, a rotating drum having circumferential rows of pockets in the periphery and annular grooves arranged midway of each of said rows of pockets, said gear extending into one of said grooves and having teeth of a corresponding mesh to said pockets, a gear wheel rotatably mounted and extending into another of said grooves and having teeth of a mesh corresponding with the mesh of the pockets, a cam secured to the latter gear wheel, a pivotal arm operatively engaging said cam, a ball receptacle arranged over said drum and having separate compartments each communicating with a separate row of pockets, means for feeding balls to the compartment communicating with the row of pockets to operate the cam gear, and means operated by said cam and pivotal arm for feeding balls to the row of pockets coöperating with the gear for directly operating the indicator mechanism.

GEO. H. BOURNE.